United States Patent [19]
Ishikawa et al.

[11] Patent Number: 5,922,250
[45] Date of Patent: Jul. 13, 1999

[54] METHOD OF MANUFACTURING OPTICAL-USE PLASTIC PRODUCTS

[75] Inventors: Hikaru Ishikawa; Kunio Machida, both of Tokyo, Japan

[73] Assignee: Bridgestone Corporation, Tokyo, Japan

[21] Appl. No.: 08/963,359

[22] Filed: Nov. 3, 1997

[30] Foreign Application Priority Data

| Nov. 5, 1996 | [JP] | Japan | 8-309991 |
| Nov. 5, 1996 | [JP] | Japan | 8-309992 |
| Nov. 5, 1996 | [JP] | Japan | 8-309993 |
| Nov. 5, 1996 | [JP] | Japan | 8-309994 |
| Nov. 5, 1996 | [JP] | Japan | 8-309995 |
| Nov. 5, 1996 | [JP] | Japan | 8-309996 |
| Dec. 19, 1996 | [JP] | Japan | 8-354353 |

[51] Int. Cl.$^6$ .............................................. B29D 11/00
[52] U.S. Cl. ............................ 264/1.7; 264/2.2; 264/2.6
[58] Field of Search ............................ 264/1.1, 1.7, 2.2, 264/2.3, 2.6, 328.7, 328.8

[56] References Cited

U.S. PATENT DOCUMENTS

| 3,248,460 | 4/1966 | Naujokas | 264/1.7 |
| 5,405,557 | 4/1995 | Kingsbury | 264/1.7 |
| 5,523,030 | 6/1996 | Kingsbury | 264/2.2 |
| 5,531,940 | 7/1996 | Gupta et al. | 264/1.7 |

*Primary Examiner*—Mathieu D. Vargot
*Attorney, Agent, or Firm*—Jordan and Hamburg LLP

[57] ABSTRACT

A method is provided for manufacturing an optical plastic article formed of a plastic resin composition and having a homogeneous construction and a surface shape within a predetermined dimensional accuracy. A first step includes injection molding melted resin of the plastic resin composition into a mold cavity to produce a primary molding. A second step includes injection molding melted resin of the plastic resin composition which is the same as in the first step over at least a portion of the primary molding to form a secondary molding melt-welded to the primary molding and having the surface shape within the predetermined dimensional accuracy. The secondary molding has a secondary molding maximum thickness less than a limit thickness at which shrinkage exceeds limits of the predetermined dimensional accuracy. The optical plastic article has an optical plastic article thickness defined by the primary molding and the secondary molding greater than the limit thickness. The primary molding is preferably preheated prior to the secondary molding being melt-welded thereto and can have a thickness greater than the limit thickness.

18 Claims, 6 Drawing Sheets

METHOD OF MANUFACTURING OPTICAL-USE PLASTIC PRODUCTS

BACKGROUND OF THE INVENTION

The present invention relates to a method of manufacturing optical-use plastic products such as magnifying lenses, various finders, etc. for naked-eye viewing; spectacle lens and contact lens in ophthalmology; condensers; infrared ray projectors, radiation thermometers, solar furnace, vehicle mounted lighting devices in illumination and light-reception systems; various lenses in photography systems, interferometers, scanners, and in laser optical systems.

Generally, glass is conveniently used to manufacture optical products because of advantages including a rich choice of kinds, high stability of optical properties, high thermal resistance, and less change of properties due to temperature variation. However, the optical glass is not free from all defects. It is disadvantageously heavy and hard and needs a process of polishing, which leads to a reduced productivity. Also, a glass product having a non-spherical shape cannot be polished with a high reproducibility and thus, productivity is low. Furthermore, some kinds of the optical glass are poor in weatherability.

Accordingly, it has been proposed to use plastics for manufacturing optical-use products in order to overcome the above-mentioned drawbacks of optical glass. The optical-use plastic products are advantageous in that they are lightweight and have high impact resistance. At present, optical-use plastic is successfully used to make spectacle lenses. Other advantageous of optical-use plastics include ease variable forming, a reduced number of manufacturing steps by mass production using injection molding, and excellent reproducibility of product shape, etc.

The optical-use plastic products are manufactured by grinding and polishing as well as by injection molding. Recently, an injection and compression molding method, namely, an advanced injection molding method, has been proposed which includes (1) Rolinx method molding, (2) micro-molding, and (3) injection pressing. These methods will be further described herebelow.

(1) Rolinx method molding

A melted resin is injected into a mold held with a low clamping force. During the resin filling into the mold, the injecting pressure exceeds the molding clamping force to cause a parting line of the mold to open. Upon completion of the resin filling, the injection gate is closed and the mold is pressed to close the parting line. The mold, and thus the resin in it, are cooled with the mold kept pressed.

(2) Micro-molding

The parting line of the mold is closed with a mold clamping force. After a specified amount of resin is injected into the mold cavity, the molded resin is compressed by a separate independent pressurizing machine which is a hydraulic cylinder assembled in the mold or one assembled in a movable platen of an injection molder.

(3) Injection pressing

A melted resin is injected into the mold internal space which is increased for a compression stroke, the mold is closed in process or upon completion of the resin injection, and the molded resin is compressed by a clamping force.

These molding methods are used to provide plastic products having a dimensional accuracy that is increasingly higher than ever. For these methods, however, the injection molder and mold are designed to have a complicated structure and advanced precision molding techniques are necessary. In the technical and economical respects, these methods are not yet as popular as common methods in the industrial manufacture of optical-use plastic products.

However, the grinding and polishing method permits easy forming of flat and spherical surfaces with a high accuracy of working but cannot form non-spherical surfaces with high accuracy although it needs a great number of manufacturing steps. In the injection molding, as the temperature of a product removed from a mold falls the product will shrink, leading to a difference of product dimensions from those which the mold should assure. The phenomenon will take place more noticeably for products of 10 mm or more in maximum wall thickness and having an asymmetrical, unevenly-thick structure.

As mentioned above, the conventional injection molding is disadvantageous in that, as the temperature of a product removed from a mold falls, the product will shrink, leading to a difference of product dimensions from those which the mold should assure. Also, in the grinding and polishing method, a cast plastic block has to be machined to an intended shape (for example, lens shape) and then polished. This method can assure a high accuracy for flat and spherical surfaces but not for non-spherical surfaces and needs a large number of manufacturing steps.

SUMMARY OF THE PRESENT INVENTION

Accordingly, the present invention has an object to overcome the above-mentioned drawbacks of the prior art by providing a method of manufacturing optical-use plastic products, even with a maximum wall thickness of 10 mm or more and asymmetrical, unevenly-thick structure, with a high productivity, dimensional accuracy and surface-shaping accuracy.

The above object is accomplished by providing a method of manufacturing optical-use plastic products, comprising, according to the present invention, a step A for injecting a melted resin into a mold cavity to produce a primary molding, and a step B for injecting a same resin as in the step A to a part or whole of the primary molding to form a molding in which the injected resin is melt-welded to the primary molding.

These objects and other objects, features, aspects and advantages of the present invention will become more apparent from the following detailed description of the present invention when taken in conjunction with the accompanying drawings.

DETAILED DESCRIPTION OF THE INVENTION

Figure 1:
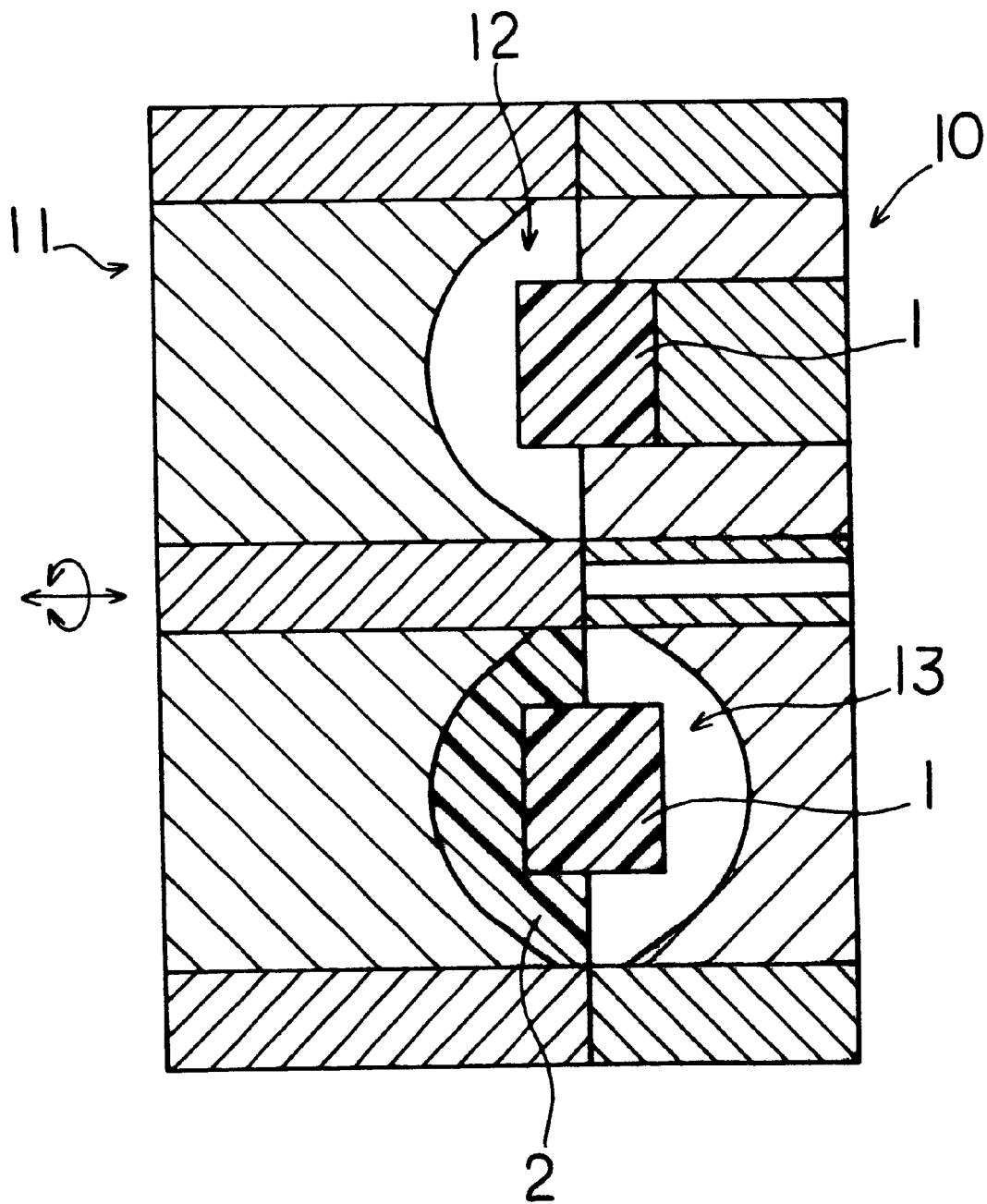
FIG. 1 is a sectional view of an example of a mold used in manufacturing an optical-use plastic product according to the present invention.
Figure 2:
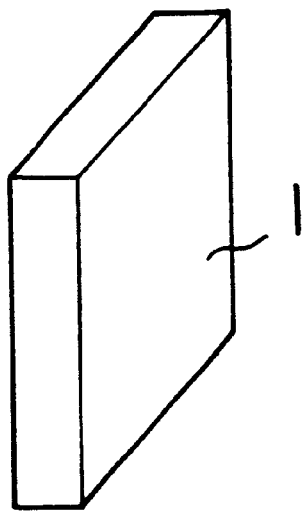
FIG. 2 is a perspective view of a primary molding.

FIG. 1 shows an example of mold used in a first embodiment of a method of manufacturing optical-use plastic products according to the present invention. FIGS. 1 to 4 are perspective views showing, by way of example, moldings produced at various steps of the method of manufacturing optical-use plastic products according to the present invention. The reference numeral 1 indicates a primary molding 1 (also see FIG. 2) produced in a separate injection mold (not shown). The mold assembly used in the present invention consists of two stages, upper and lower. A secondary molding 2 is produced by injection molding in the upper stage, while a tertiary molding 3 (see FIG. 4) is produced by injection molding in the lower stage. The right-hand portion of the mold assembly is a stationary mold 10 and the left-hand portion is a moving mold 11. The mold assembly has also a cavity 12 for production of the secondary molding 2.

Figure 3:
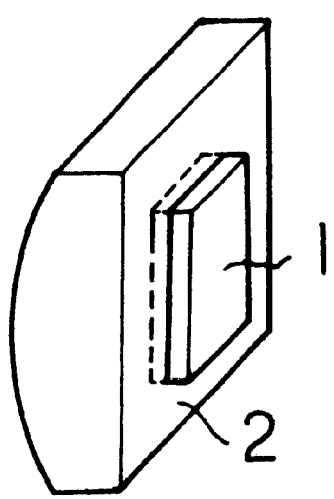
FIG. 3 is a perspective view of a melt-welded assembly of the primary molding and a secondary molding.
Figure 4:
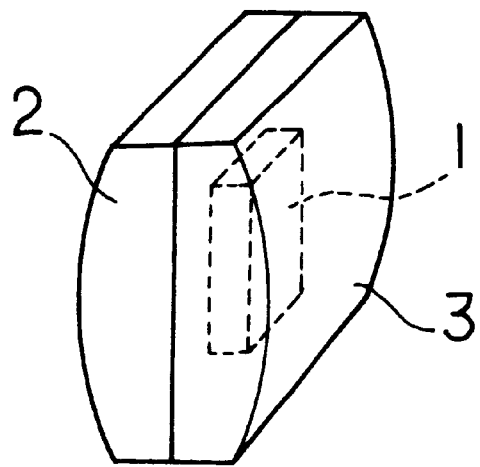
FIG. 4 is a perspective view of a final product.

A melted resin is injected into the cavity 12 to produce the secondary molding 2 integral with the primary molding 1 (as shown in FIG. 3). It should be noted here that since the primary and secondary moldings 1 and 2 are formed from the same resin (identical in nature and grade), the melted resin for the secondary molding 2, put into contact with the primary molding 1, will be melted to fully cover the primary molding 1 and thus melt-welded integrally to the primary molding 1; therefore, the molding shown in FIG. 3 will not have any material or optical boundary between the primary and secondary moldings 1 and 2.

Finally, after the secondary molding 2 is formed, the moving mold 11 is opened from the stationary mold 10 and turned to set the lower stage of the mold assembly as shown in FIG. 1. A melted resin is injected into a cavity 13 to form a tertiary molding 3 (for final product, shown in FIG. 4) which is melt-welded integrally to the primary and secondary moldings 1 and 2 in the same manner as described above. Note that since the primary, secondary and tertiary moldings 1, 2 and 3 are formed from resins of the same type, the melted resin for the tertiary molding 3, put into contact with the primary and secondary moldings 1 and 2, will be melted to fully cover adjacent surfaces of the primary and secondary moldings 1 and 2 and thus melt-welded integrally to them; therefore, the molding shown in FIG. 4 will not have any material or optical boundary between the primary, secondary and tertiary moldings 1, 2 and 3.

It should be noted that the mold used in the present invention is not limited to the above-mentioned one consisting of the stationary and moving molds 10 and 11 but may be a well-known one, for example, in which a plurality of primary moldings and subsequent-order ones, including a final product, can be set. Using such a mold, various-order moldings and final products can be formed in one molding cycle. Note that in each molding cycle, various-order moldings are transferred into places for the next step of molding; however, one final product can be yielded in each molding cycle as mentioned above. As a result, the molding time down to a final product is considerably short as compared with molding of such various-order moldings and a final product is produced each in one mold, which leads to a dramatically improved productivity.

The aforementioned step B should preferably be done more than once, which is described in the foregoing (for forming secondary and tertiary moldings). When the step B is done once, a melted resin is injected into the mold cavity to form a primary molding 1 (step A). There after the same resin as used in the step A is injected to a part or whole of the primary molding 1 to integrally weld the primary molding 1 and melted resin with each other to form a molding (step B). This molding is a final product.

In the aforementioned embodiment, one primary molding 1 is used as the core. However, two or more primary moldings 1 may be used depending upon the shape and size of an intended final product. FIGS. 1 to 4 show an example of resin molding for a convex lens. For a concave lens, the primary molding 1 may be placed near a possible outer circumference of the convex lens. The primary molding 1 used to form the concave lens has a doughnut-like shape open at the center thereof. Such optical products as these lenses should have a high dimensional accuracy.

In selection of optical-use plastics, it is important to select ones transparent to visible rays of light. Further, the resins should be as follows:

(1) Visible rays of light are not absorbed inside the resin. That is, it has a light transmittance as high as possible.

(2) It has a compact structure. No spherulite should desirably exist.

(3) It is isotropic and homogeneic, which contributes to the stability of optical properties such as index of refraction, etc.

In these respects, any one of polymethyl methacrylane (PMMA), polystyrene (PS), acrylonitrile styrene copolymer (AS), polycarbonate (PC), polymethyl pentene, styrene butadiene copolymer, etc. should preferably be selected for the optical-use plastics.

The present invention will be further described with reference to embodiments and comparative products. It should be noted, however, that the present invention is not limited to the embodiments.

Figure 5:
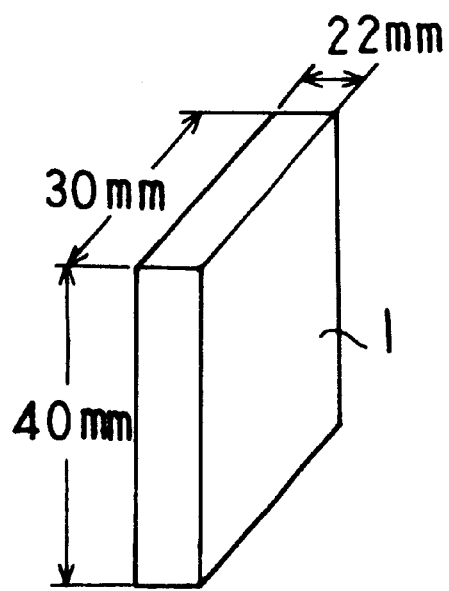
FIG. 5 is a perspective view of a primary molding according to the present invention.

First embodiment (I) Forming of primary molding:
A primary molding 1 shown in FIG. 5 is formed by injecting molding under the following conditions:

| | |
|---|---|
| Injection molder | M-100A-TS by Meiki Seisakusho Co., Ltd. |
| Resin | Delpet 80N (PMMA by Asahi Chemical Industry Co., Ltd.; predried at 80° C. for 4 hours) |
| Injection conditions | Barrel (cylinder) temperature setting: Nozzle 230° C. Barrel 245° C. Hopper 230° C. |
| Mold temperature | 90° C. (setting by water circulation) |

In this injection molding, surface shrinkage or dimensional inaccuracy took place without voids depending upon set secondary to tertiary pressures of injection (dwell). The primary molding thus formed was used as it was for forming a secondary molding 2 and also for forming a tertiary molding 3.

Figure 6:
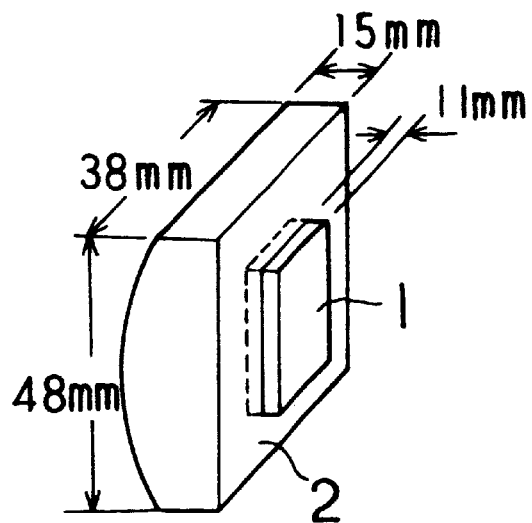
FIG. 6 is a perspective view of an integral assembly of a primary molding and a secondary molding according to the present invention.
Figure 7:
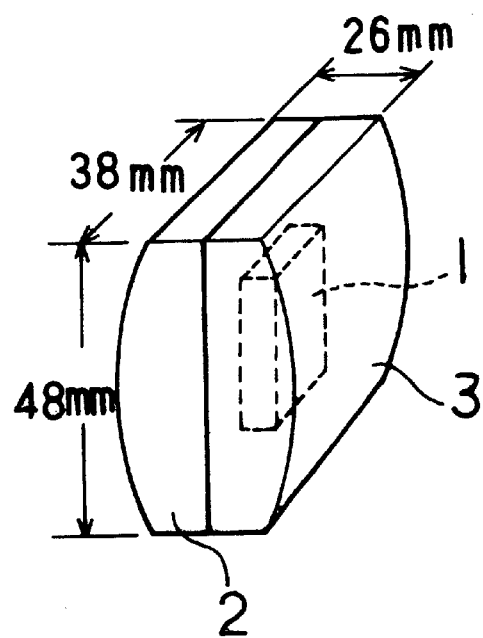
FIG. 7 is a perspective view of a final product according to the present invention.

(II) Forming of secondary and tertiary moldings:
Next, a resin is injected to the primary molding 1 formed as in the above to form secondary and tertiary moldings 2 and 3 (shown in FIGS. 6 and 7) one after another. The secondary and tertiary moldings 2 and 3 were formed over the primary molding 1 (even with the dimensional inaccuracy) to predetermined dimensions without any defects such as shrinkage, etc. Even a lens having a non-spherical shape as shown in FIG. 7 was formed precisely to the dimensions of the mold, which was confirmed by a three-dimensional shape measurement. Visual checking of the final molding in the sunlight proved no boundary between the primary, secondary and tertiary moldings. When a laser beam was projected at a right angle to the final molding, no boundary was visually found between the primary and tertiary moldings. When the laser beam was incident at an angle of 45 degrees upon the final molding, no boundary was found.

Forming the final molding in the above embodiment without forming the primary to tertiary moldings was attempted for comparison purposes. In an ordinary injection molding, occurrence of voids could be avoided by appropriately selecting injection-molding conditions but noticeable shrinkage was found on the outer surface including the non-spherical portion. Only appropriate selection of the injection-molding conditions could not allow to form the final molding precisely to predetermined dimensions, namely, to the mold dimensions.

Figure 8:
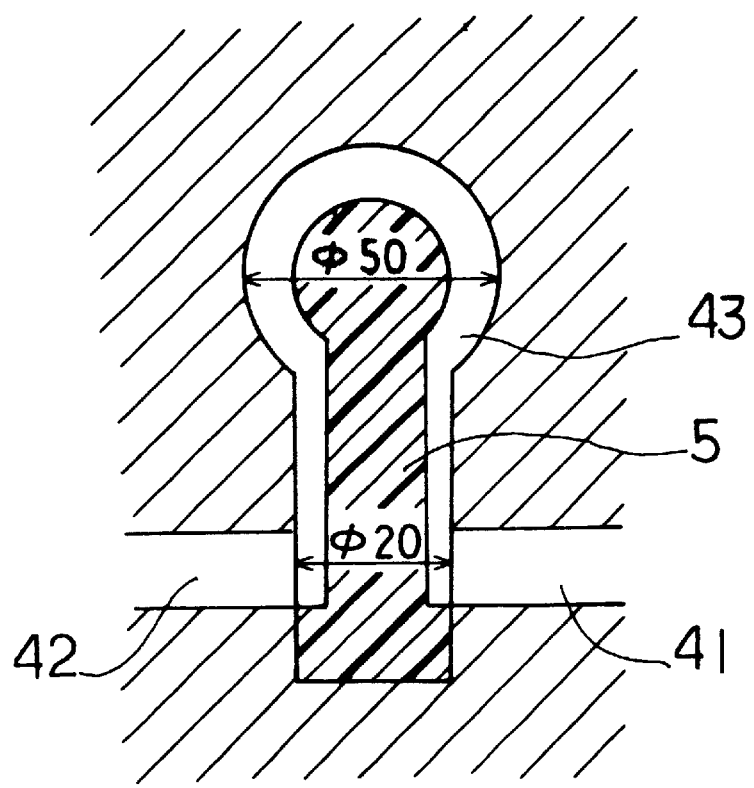
FIG. 8 is a sectional view of a primary molding set in a mold.

FIG. 8 shows the method of forming the optical-use plastic product according to a second embodiment of the present invention. According to this embodiment, a primary molding 5 formed from a polymethyl methacrylate (PMMA), for example, by injection molding was set into a mold 40. The same resin used to form the primary molding 5 was injected to a part of the primary molding 5 at a temperature in the range of a recommended lowest temperature of injection plus 5° C. to recommended highest temperature minus 5° C. FIG. 8 shows the section of the mold into which the resin is to be injected. The resin, for example, polymethyl methacrylate (PMMA), was injected into a cavity 43 through gates 41 and 42. Thus, the primary molding 5 was formed from the melted resin injected into the mold cavity as shown.

The space between the wall of the cavity 43 in the mold 40 shown in FIG. 8 and the primary molding 5 ranges from 1 to 15 mm. The thickness of the resin covering the primary molding 5 is therefore within a range of 1 to 15 mm. In FIG. 8, the diameters φ50 and φ20 are represented in millimeters. If the covering resin (to be injected to the primary molding already set in the mold cavity) is too thin, the resistance against the resin flow is too high so that a sufficient amount of the resin will not flow into small spaces. On the contrary, if the resin thickness is too great, shrinkage and voids peculiar to thick moldings are likely to take place. The thickness of such covering resin should be 1 to 15 mm, and more preferably, 3 to 10 mm though it depends upon the kind and grade of the resin used.

Figure 9:
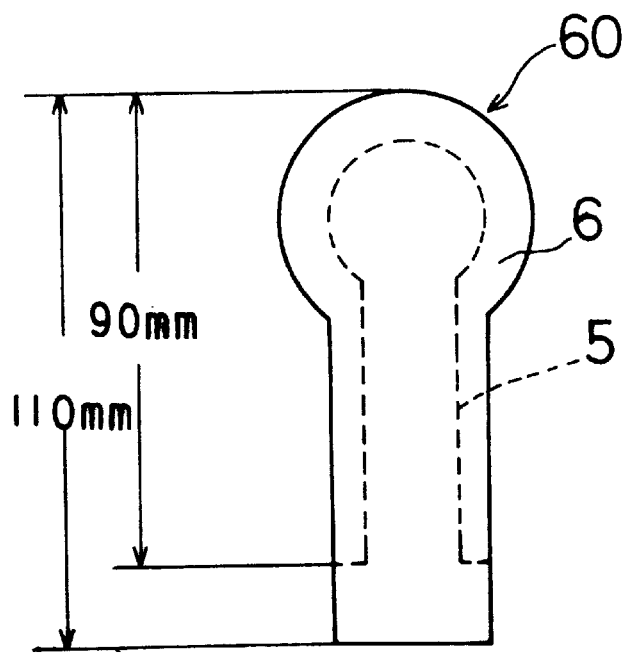
FIG. 9 is a front view of the final product of FIG. 8.

FIG. 9 shows a final molding, that is, an optical-use plastic product 60. In the product 60, the secondary molding 6 covers a part of the primary molding 5. The moldings 5 and 6 are melt-welded integrally to each other. The maximum thickness of this optical-use plastic product 60 is 50 mm.

Figure 10:
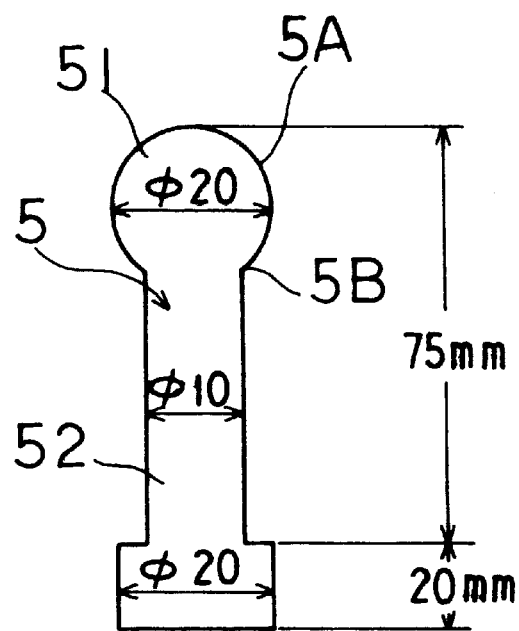
FIG. 10 is a front view of the primary molding of FIG. 8.

FIG. 10 shows a primary molding 5. In this Figure, the diameters φ10 and φ20 are also represented in millimeters. The thickness of the resin covering the primary molding 5 is 15 mm at the spherical portion and 5 mm at the cylindrical column when a secondary molding is formed on the primary molding 5 as shown in FIG. 8. The primary molding 5 serves as the core of a final molding and is inserted into a secondary molding 6, which means that high accuracy of dimensions is not required for the primary molding 5 unless there is a defect such as voids, surface depression or the like. In this case, however, a high accuracy of dimension is required for the mold for forming the secondary molding 6.

It should be noted that after injection molding of the primary molding 5, the surface of the primary molding 5 should desirably be cleaned (by wiping) with a solvent to remove stains on the surface. This cleaning will contribute to a better melt-welding of the primary molding 5 to a covering resin. The solvent used for this cleaning is not limited to any special one. It maybe any one of organic solvents made from paraffin hydrocarbon, alcohol, petroleum, etc. Among others, however, ethanol or hexane may be suitable for such cleaning.

If the temperature of the covering resin (to be injected to a primary molding) is too low, it will solidify too early on the surface of the primary molding 5 (also called insert work) so that the melt-welding between the inserted primary molding 5 and the covering resin will not easily take place. On the other hand, if the temperature is too high, the melt-welding will readily take place but shrinkage will also possibly take place. The temperature of a resin to be injected depends upon the grade of the resin and should preferably be within a range from the recommended lowest temperature of injection plus 5° C. to the recommended highest temperature minus 5° C.

For forming the secondary molding, the primary molding is secured within the mold at a place which will not have any most adverse influence on the optical performance of the final product.

Figure 11:
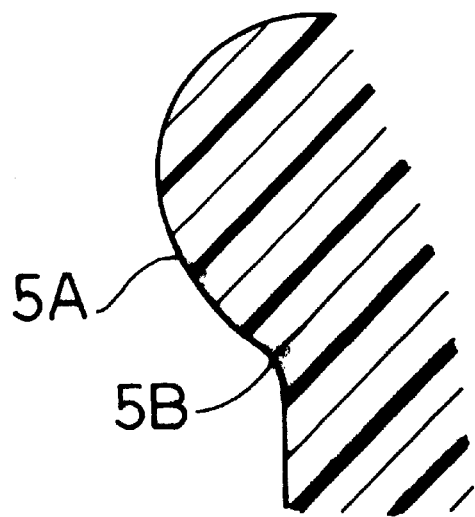
FIG. 11 is a sectional view, enlarged in scale, of a joint of the primary molding of FIG. 10.

As shown in FIG. 10, a spherical expansion head 51 of the primary molding 5 has a curved circumference 5A. There exists between the spherical expansion head 51 and cylindrical column 52 a connection 5B having a smooth curved circumference as shown in FIG. 11. Such a round shaping of the primary molding 5 allows the covering resin (for a secondary molding) to flow into small spaces. If the covering resin (to be injected to the primary molding already set in the mold cavity) is too thin, the resistance against the resin flow is so high that a sufficient amount of the resin will not flow into small spaces. On the contrary, if the resin thickness is too great, shrinkage and voids peculiar to thick moldings are likely to take place. The thickness of such covering resin should be 1 to 15 mm, and more preferably, 3 to 10 mm though it depends upon the kind and grade of the resin used.

If the temperature of the covering (to be injected to a primary molding) resin is too low (lower than the recommended lowest temperature of injection plus 5° C.), it will solidify too early on the surface of the primary molding 5 (insert work) so that melt-welding between the insert work and covering resin will not readily take place. On the other hand, if the temperature is too high (higher than the recommended highest temperature minus 5° C.), melt-welding will readily take place but shrinkage will also possibly take place. Ranges of recommended temperature of injection is shown in Table 1. The temperatures in Table 1 are standard cylinder temperatures in injection molding of various grades of "Delpet", Trade Name of the Asahi Chemicals Industry Co., Ltd.

TABLE 1

| | Cylinder temperatures | | | | |
|---|---|---|---|---|---|
| Grade | 560F | 60N | 670N | 80N | LP-1 |
| Nozzle (° C.) | 190–230 | 200–240 | 200–240 | 220–260 | 230–270 |
| Hopper (° C.) | 190–230 | 200–220 | 200–220 | 220–240 | 230–250 |

Note that a product containing the primary molding 5 covered by the secondary molding 6, that is, the molding shown in FIG. 9, may not be taken as the final molding but it may be further covered, by injection, with the same resin type as that for the primary and secondary molding 5 and 6. This molding may be taken as the final molding. More particularly, the final molding has three layers at a part thereof. Of course, it maybe formed in 4 or more layers. According to the present invention, a melted resin is injected into a mold cavity to form a primary molding 5 (step A), and the same resin type as in the step A is injected to a part or whole of the primary molding 5. A secondary molding 6 is thus formed from the resin injected and melt-welded to the primary molding 5 (step B). The step B may be repeated a plurality of times. The covering resin should preferably have a thickness of 1 to 15 mm, and more preferably a thickness of 3 to 10 mm.

Second embodiment

| | | |
|---|---|---|
| (I) | Forming of primary molding . . . Step A: | |
| | Injection molder | M-100A-TS by Meiki Seisakusho Co., Ltd. |
| | Resin | Delpet 80N (PMMA by Asahi Chemical Industry Co., Ltd.; predried at 80° C. for 4 hours) |
| | Injecting conditions | Barrel (cylinder) temperature setting: |
| | | Nozzle   230° C. |
| | | Barrel   245° C. |
| | | Hopper   230° C. |
| | Mold temperature | 90° C. (setting by water circulation) |
| | Molding time | 120 sec |

A primary molding 5 having the round connection 5B as in FIG. 11 was formed under the above conditions.

(II) Forming of secondary molding . . . Step B

Next, the surface of the primary molding 5 thus produced was cleaned. The primary molding was preheated and set inside the mold 40 as shown in FIG. 8. A material for secondary molding (PMMA resin) was injected to the primary molding 5 under the above conditions to form a secondary molding 6 shown in FIG. 9. The primary moldings 5, including defective ones, were used for forming the secondary molding. In all cases, appropriately setting the injection-molding conditions such as secondary to tertiary pressures of injection (dwelling) allowed forming secondary moldings 6 precisely to the predetermined dimensions without occurrence of any defects such as shrinkage, void or the like. Among others, the spherical portion of φ50 mm in diameter shown in FIG. 9, which is thick, was confirmed by three-dimensional shape measurement to have been formed to the mold dimensions. The molding time for this secondary molding was 150 seconds. The molding time for the secondary molding 5 and 6 was 120 seconds. Therefore, the total molding time was 270 seconds in total.

If in the secondary step of molding, a resin is injected to a primary molding 5 with a corner or corners, it will not smoothly flow over the corner and voids or bubbles will be likely to occur in the resin at the corner. To avoid this, the corner should desirably be rounded.

Visual checking of the second molding in the sunlight proved no boundary between the primary and secondary moldings 5 and 6. When a laser beam was projected at arbitrary angles to arbitrary portions of the secondary molding, no boundary was visually found between the primary and secondary moldings.

For comparison with the aforementioned embodiment, a secondary molding was formed on a primary molding 5 having corner at the connection 5B. The results of the comparison are as follows:

Molding according to the embodiment

The primary and secondary moldings are melt-welded to each other independently of the injecting conditions. Visual checking of the molding thus formed in the sunlight proved no boundary between the primary and secondary moldings. Also, laser beam was projected at a right angle and also at 45 degrees to the molding. However, no boundary was visually found between the primary and secondary moldings.

Comparative molding

There was a poor flow over the corner in a region where the injected resin flowed fast, and voids or bubbles were found between the primary and secondary moldings at a part of such region.

Third embodiment

The surface of a primary molding formed by injection-molding was mirror-finished by polishing with a diamond paste. Thereafter, the surface was preferably cleaned with ethanol or hexane. The primary molding was preheated, and then set inside a mold similar to that shown in FIG. 8. A resin intended for covering the primary molding was heated to temperature between the recommended lowest temperature of injection plus 5° C. and the recommended highest temperature minus 5° C., and injected to the primary molding.

A secondary molding was formed (step B) in the same manner as in the aforementioned first and second embodiments.

According to this third embodiment, a final molding using a primary molding of which the surface is allowed to freely shrink without dwelling under any pressure is taken as a product A, and a final molding using a primary molding of which the surface was mirror-finished by polishing with a diamond paste was taken as a product B. These products A and B were visually checked for any boundary between the primary and secondary moldings.

The results of visual checking are as follows:

Product A

Visual checking of the product in the sunlight proved no boundary between the primary and secondary moldings. Laser beam was projected at a right angle and also at 45 degrees to the product. In any case, no boundary was visually found between the primary and secondary moldings.

Product B

The product was visually checked in the sunlight, but no boundary was found between the primary and secondary moldings. Also, laser beam was projected at a right angle and also at 45 degrees to the product. In any case, no boundary was visually found between the primary and secondary moldings.

For comparison with the above products A and B, the surface of a primary molding formed as in the above was polished with an abrasive sheet #1000 and further subjected to the above-mentioned secondary step of molding. This comparative product was also visually checked in the sunlight. A boundary was found between the primary and secondary moldings in this product. Also, laser beam was projected to this product. Some diffusion of the laser beam was found in the boundary between the primary and secondary moldings.

These results prove that when the surface of the primary molding is smooth, the covering resin for the secondary molding will completely wet the surface of the primary molding, leading to an easy melt-welding between the primary and secondary moldings and that if the surface of the primary molding is rough, the covering resin for the secondary molding will not completely wet the surface of the primary molding so that no complete melt-welding will easily take place between the primary and secondary moldings.

Note that if the primary molding has a corner or corners on the outer circumference thereof, the resin will not smoothly flow over the corner and voids or bubbles will take place in that region. To avoid this, the primary molding should preferably be designed for a shape having no such corner on the outer circumference thereof.

Fourth embodiment

A primary molding is formed by injecting a melted resin into the cavity of a mold (not shown). The surface of the primary molding 1 is preheated at a temperature below the softening point of the resin for the secondary molding. The preheated primary molding is set into a mold similar to that in the aforementioned first to third embodiments, and the same resin type as that used for the primary molding is injected to a part of the primary molding. The temperatures shown in Table 2 are softening points of polymethyl methacrylate (PMMA), an example of resin used in the present invention, in injection molding of various grades of "Delpet", Trade Name for PMMA of the Asahi Chemicals Industry Co., Ltd.

TABLE 2

| | Softening points as in ASTM D648 | | | | |
|---|---|---|---|---|---|
| Grade | 560F | 60N | 670N | 80N | LP-1 |
| Softening point (° C.) | 84 | 89 | 84 | 100 | 95 |

If the insert work (primary molding) is not preheated, it will have so large a difference in temperature from a covering resin which is going to be injected to the insert work, that the surface of the insert work will not readily be melted by the covering resin and thus melt-welding will not easily take place between the insert work and the covering resin. By reducing such temperature difference between the insert work and covering resin through preheating of the insert work, a melt-welding will easily take place between the insert work and covering resin. The preheating temperature varies depending upon the kind and grade of the resin used, and it should be within a range from a temperature of the softening point of that resin minus 50° C. to that softening point temperature.

The primary molding in the fourth embodiment was preheated at 100° C. for one hour in an oven and taken as the product C. Also, a same primary molding was preheated at 80° C. for one hour in the oven. This was taken as the product D. Further, another same primary molding was preheated at 60° C. for one hour in the oven and taken as the comparative product 1. A still another same primary molding was preheated at 40° C. for one hour in the oven and taken as the comparative product 2. Also a yet another same primary molding was left at room temperature (25° C.) and taken as the comparative product 3. These products were compared with each other. The results of comparison are as will be described below.

Product C

Visual checking of the product in the sunlight proved no boundary between the primary and secondary moldings. Laser beam was projected at a right angle and also at 45 degrees to the product. In any case, no boundary was visually found between the primary and secondary moldings.

Product D

Visual checking of the product in the sunlight proved no boundary between the primary and secondary moldings. A laser beam was projected at a right angle and also at 45 degrees to the product. In any case, no boundary was visually found between the primary and secondary moldings.

Comparative product 1

This comparative product was also visually checked in the sunlight. Only an indistinct boundary was found between the primary and secondary moldings in this product. Also, a laser beam was projected to this product. Some diffusion of the laser beam was found in the boundary between the primary and secondary moldings.

Comparative product 2

This product was also visually checked in the sunlight. A boundary was found between the primary and secondary moldings in this product. Also, a laser beam was projected to this product. Some diffusion of the laser beam was found in the boundary between the primary and secondary moldings.

Comparative product 3

This product was also visually checked in the sunlight. A boundary was found between the primary and secondary moldings in this product. Also, a laser beam was projected to this product. Some diffusion of the laser beam was found in the boundary between the primary and secondary moldings.

These results prove that when the primary molding is preheated at a temperature of 60° C. and above, the covering resin (secondary molding) will be completely melt-welded to the primary molding and that if the primary molding is preheated at a temperature lower than 60° C., the covering resin and primary molding will not readily be melt-welded to each other. It should be noted that the above findings were obtained using "Delpet" 80N.

Note that if the primary molding has a corner or corners on the outer circumference thereof, the resin will not smoothly flow over the corner and voids or bubbles will take place in that region. To avoid this, the primary molding should preferably be designed to have a shape having no such corner on the outer circumference thereof.

As having been described in the foregoing, the method of manufacturing optical-use plastic products according to the present invention comprises a step A for injecting a melted resin into a mold cavity to produce a primary molding, and a step B for injecting the same resin type as in the step A to a part or whole of the primary molding and melting the resin to form a molding melt-welded integrally to the primary molding. Since the manufacture is conducted in several steps, the cycle time can be reduced to improve the productivity. Also, the molding thickness at the final step of molding can be made relatively small to provide optical-use plastic products having intended shapes and high surface-shaping accuracy. Especially in the present invention, more or less shrinkage in the primary molding is not a problem since the resin is melt-welded between the primary molding and covering resin. Further, the molding thickness can be freely adjusted by repeating the step B.

What is claimed is:

1. A method of manufacturing an optical plastic article formed of a plastic resin composition having a shrinkage characteristic correlated to molding thickness, said optical plastic article having a homogeneous construction, a surface shape within a predetermined dimensional accuracy and an optical product thickness with a correlated shrinkage characteristic exceeding limits of said predetermined accuracy, the method comprising the following steps:

(A) injection molding melted resin of said plastic resin composition into a mold cavity to produce a primary molding; and (B) injection molding melted resin of said plastic resin composition which is the same as in the step (A) over at least a portion of said primary molding to form a secondary molding melt-welded to the primary molding and having said surface shade within said predetermined dimensional accuracy, said secondary molding having a secondary molding maximum thickness less than a limit thickness at which shrinkage exceeds limits of said predetermined dimensional accuracy, and said optical plastic article having said optical plastic article thickness defined by said primary molding and said secondary molding and greater than said limit thickness.

2. The method as set forth in claim 1, wherein said optical plastic article thickness is 10 mm or more.

3. The method as set forth in claim 1 or 2, wherein said surface shape is asymmetrical and defines a range of thicknesses.

4. The method as set forth in any one of claims 1 or 2, wherein the step B is repeated 2 times or more.

5. The method as set forth in claim 1, wherein said surface shape defines a non-spherical surface.

6. A method of manufacturing an optical plastic article formed of a plastic resin composition having a shrinkage characteristic correlated to molding thickness, said optical plastic article having a homogeneous construction, a surface shape within a predetermined dimensional accuracy and an optical product thickness with a correlated shrinkage characteristic exceeding limits of said predetermined accuracy, the method comprising the following steps:

(A) injection molding melted resin of said plastic resin composition into a mold cavity to produce a primary molding; and (B) injection molding melted resin of said plastic resin composition which is the same as in the step (A) over at least a portion of said primary molding to form a secondary molding melt-welded to the primary molding and having said surface shape within said predetermined dimensional accuracy, said secondary molding having a secondary molding maximum thickness less than a limit thickness at which shrinkage exceeds limits of said predetermined dimensional accuracy and within a range of 1 to 15 mm, and said optical plastic article having said optical plastic article thickness defined by said primary molding and said secondary molding and greater than said limit thickness.

7. The method as set forth in claim 6, wherein said secondary molding has a maximum thickness of 30 mm or more.

8. A method of manufacturing an optical plastic article formed of a plastic resin composition having a shrinkage characteristic correlated to molding thickness, said optical plastic article having a homogeneous construction, a surface shape within a predetermined dimensional accuracy and an optical product thickness with a correlated shrinkage characteristic exceeding limits of said predetermined accuracy, the method comprising the following steps:

(A) injection molding melted resin of said plastic resin composition into a mold cavity to produce a primary molding; and (B) injection molding melted resin of said plastic resin composition which is the same as in the step (A) over at least a portion of said primary molding to form a secondary molding melt-welded to the primary molding and having said surface shape within said predetermined dimensional accuracy, said secondary molding having a secondary molding maximum thickness less than a limit thickness at which shrinkage exceeds limits of said predetermined dimensional accuracy, and said optical plastic article having said optical plastic article thickness defined by said primary molding and said secondary molding and greater than said limit thickness; and said plastic resin composition being methacrylate a temperature of the melted resin injection molded in the step B being at least a recommended lowest temperature of injection plus 5° C.

9. A method of manufacturing an optical plastic article formed of a plastic resin composition having a shrinkage characteristic correlated to molding thickness, said optical plastic article having a homogeneous construction, a surface shape within a predetermined dimensional accuracy and an optical product thickness with a correlated shrinkage characteristic exceeding limits of said predetermined accuracy, the method comprising the following steps:

(A) injection molding melted resin of said plastic resin composition into a mold cavity to produce a primary molding without a corner on an outer surface thereof; and (B) injection molding melted resin of said plastic resin composition which is the same as in the step (A) over at least a portion of said primary molding to form a secondary molding melt-welded to the primary molding and having said surface shape within said predetermined dimensional accuracy, said secondary molding having a secondary molding maximum thickness less than a limit thickness at which shrinkage exceeds limits of said predetermined dimensional accuracy, and said optical plastic article having said optical plastic article thickness defined by said primary molding and said secondary molding and greater than said limit thickness.

10. A method of manufacturing an optical plastic article formed of a plastic resin composition having a shrinkage characteristic correlated to molding thickness, said optical plastic article having a homogeneous construction, a surface shape within a predetermined dimensional accuracy and an optical product thickness with a correlated shrinkage characteristic exceeding limits of said predetermined accuracy, the method comprising the following steps:

(A) injection molding melted resin of said plastic resin composition into a mold cavity to produce a primary molding;

(B) cleaning said primary molding with a solvent; and (C) injection molding melted resin of said plastic resin composition which is the same as in the step (A) over at least a portion of said primary molding to form a secondary molding melt-welded to the primary molding and having said surface shape within said predetermined dimensional accuracy, said secondary molding having a secondary molding maximum thickness less than a limit thickness at which shrinkage exceeds limits of said predetermined dimensional accuracy, and said optical plastic article having said optical plastic article thickness defined by said primary molding and said secondary molding and greater than said limit thickness.

11. The method as set forth in claim 10, wherein said solvent is an organic solvent.

12. The method as set forth in claim 11, wherein the organic solvent is selected from the group consisting of ethanol and hexane.

13. A method of manufacturing an optical plastic article formed of a plastic resin composition having a shrinkage characteristic correlated to molding thickness, said optical plastic article having a homogeneous construction, a surface shape within a predetermined dimensional accuracy and an optical product thickness with a correlated shrinkage characteristic exceeding limits of said predetermined accuracy, the method comprising the following steps:

(A) injection molding melted resin of said plastic resin composition into a mold cavity to produce a primary molding;

(B) smoothing a surface of the primary molding; and (C) injection molding melted resin of said plastic resin composition which is the same as in the step (A) over at least a portion of said primary molding to form a secondary molding melt-welded to the primary molding and having said surface shade within said predetermined dimensional accuracy, said secondary molding having a secondary molding maximum thickness less than a limit thickness at which shrinkage exceeds limits of said predetermined dimensional accuracy, and said optical plastic article having said optical plastic article thickness defined by said primary molding and said secondary molding and greater than said limit thickness.

14. The method as set forth in claim 13, wherein the surface of the primary molding is smoothed by one of polishing the surface and allowing the surface to freely shrink.

15. A method of manufacturing an optical plastic article formed of a plastic resin composition having a shrinkage characteristic correlated to molding thickness, said optical plastic article having a homogeneous construction, a surface shape within a predetermined dimensional accuracy and an optical product thickness with a correlated shrinkage characteristic exceeding limits of said predetermined accuracy, the method comprising the following steps:

(A) injection molding melted resin of said plastic resin composition into a mold cavity to produce a primary molding;

(B) preheating a surface of said primary molding to a temperature below a softening temperature of said plastic resin composition; and (C) injection molding melted resin of said plastic resin composition which is the same as in the step (A) over at least a portion of said primary molding to form a secondary molding melt-welded to the primary molding and having said surface shape within said predetermined dimensional accuracy, said secondary molding having a secondary molding maximum thickness less than a limit thickness at which shrinkage exceeds limits of said predetermined dimensional accuracy, and said optical plastic article having said optical plastic article thickness defined by said primary molding and said secondary molding and greater than said limit thickness.

16. The method according to any one of claims 1, 6, 8 or 9 wherein said primary molding is preheated to a temperature in a range of a softening temperature of said plastic resin composition to 50° C. less than said softening temperature of said plastic resin composition prior said injection molding in step (B).

17. The method according to any one of claims 10 or 13 wherein after step (B) said primary molding is preheated to a temperature in a range of a softening temperature of said plastic resin composition to 50° C. less than said softening temperature of said plastic resin composition prior said injection molding in step (C).

18. The method according to any one of claims 1, 6, 8, 9, 10 or 13 wherein said primary molding has a thickness greater than said limit thickness.

* * * * *